L. BRANDEIS.
Back-Water Trap.

No. 197,511. Patented Nov. 27, 1877.

Attest:
Fred Benjamin
F. M. Green

Inventor
L. Brandeis
By his attorney
Charles E. Porter

UNITED STATES PATENT OFFICE.

LUDWIG BRANDEIS, OF BROOKLYN, NEW YORK, ASSIGNOR OF ONE-HALF HIS RIGHT TO GIULIA BRANDEIS, OF SAME PLACE.

IMPROVEMENT IN BACKWATER-TRAPS.

Specification forming part of Letters Patent No. 197,511, dated November 27, 1877; application filed October 30, 1877.

*To all whom it may concern:*

Be it known that I, LUDWIG BRANDEIS, of Brooklyn, Kings county, New York, have invented Improvements in Backwater - Traps, of which the following is a specification:

My invention relates to that class of traps intended to prevent the back flow of water from overflow of sewers; and consists in constructing the trap so that it may be readily applied in any line of sewer-pipe, and so that a free discharge of the water, &c., through the trap may be effected, whether the water is in large or small volumes.

Figure 1:
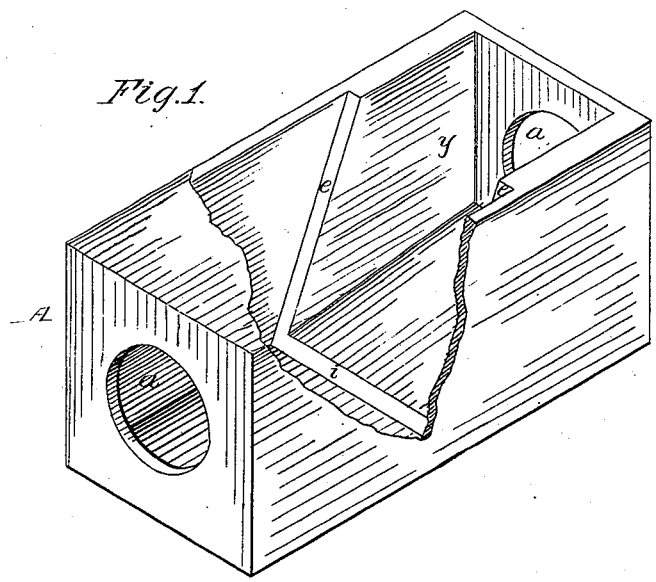
Figure 2:
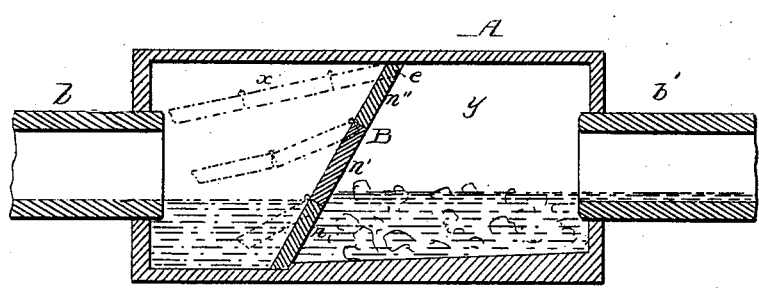

In the drawing, Figure 1 is a perspective view, partly in section, showing the casing of the trap; Fig. 2, a longitudinal section.

Backwater - traps, as usually constructed, can only be inserted in a line of pipes at considerable expense and by skilled workmen, and are inefficient, as the valves will only rise to discharge the water and matters carried thereby where the water is in large volume and under considerable head or pressure.

To remedy these difficulties I construct the trap with a casing, A, of suitable shape, having an opening, $a$, in each end to receive the ends of the sewer-pipes $b$ $b'$, and having internal inclined side bearings $e$ $e$, and a bottom bearing, $i$, for the valve B, which is hinged or pivoted directly below the top, and rests on said bearings, effectually sealing the way against any water passing from the pipe $b$ inward.

The valve, instead of being a single rigid plate, as usual, consists of two, three, or more sections, $n$ $n'$ $n''$, hinged together, as shown.

Thus constructed, the trap may be readily inserted in any line of pipe by workmen of ordinary skill, and the flow of backwater is effectually prevented. The most important advantage, however, results from the construction of the valve.

If the water flows into the trap in large quantities, the entire valve will rise, as shown, in dotted lines $x$, and permit its passage. If, however, but a small portion of water, insufficient to raise the entire valve, passes into the trap, the lower hinged section $n$ or sections $n$ $n'$ of the valve will rise as readily as would the entire valve under the pressure of a greater volume, thus effectually preventing the retention of any matters in the trap.

To insure the discharge of the matter from the chamber $y$ of the trap, the bottom of the latter is inclined toward the shoulder $i$, against which the valve bears when closed.

I claim—

1. A backwater-trap provided with a valve, B, consisting of two or more sections hinged together, as set forth.

2. The case A, having end openings for the reception of the ends of sewer-pipes, two chambers, one with a flat and the other with an inclined bottom, and with side bearings $e$ $e$ and bottom bearing $i$ for a valve, B, as set forth.

In testimony whereof I have signed my name to this specification in the presence of two subscribing witnesses.

LUDWIG BRANDEIS.

Witnesses:
   E. H. KEATING,
   CHAS. J. JOHNSON.